United States Patent
Dellanno

(10) Patent No.: US 8,016,350 B2
(45) Date of Patent: Sep. 13, 2011

(54) VEHICLE SEAT FOR REDUCING THE RISK OF SPINAL AND HEAD INJURIES OF PERSONNEL IN COMBAT VEHICLES

(76) Inventor: Ronald P. Dellanno, Bloomfield, NJ (US)

(\*) Notice: Subject to any disclaimer, the term of this patent is extended or adjusted under 35 U.S.C. 154(b) by 0 days.

(21) Appl. No.: 12/450,852

(22) PCT Filed: Apr. 17, 2008

(86) PCT No.: PCT/US2008/004981
§ 371 (c)(1),
(2), (4) Date: Dec. 22, 2009

(87) PCT Pub. No.: WO2009/017523
PCT Pub. Date: Feb. 5, 2009

(65) Prior Publication Data
US 2010/0171349 A1    Jul. 8, 2010

Related U.S. Application Data

(60) Provisional application No. 60/925,346, filed on Apr. 19, 2007.

(51) Int. Cl.
| B60N 2/427 | (2006.01) |
| B60N 21/00 | (2006.01) |
| A47C 7/14 | (2006.01) |
| A47C 1/00 | (2006.01) |

(52) U.S. Cl. ........... 297/216.12; 297/216.13; 297/284.9; 297/344.21

(58) Field of Classification Search ............. 297/344.21, 297/452.22, 452.48, 452.37, 284.1, 216.12, 297/216.13, 216.14, 284.3, 284.9, 217.3, 216.1; 701/49, 45
See application file for complete search history.

(56) References Cited

U.S. PATENT DOCUMENTS

| 5,979,989 | A * | 11/1999 | Herbst ................... 297/452.22 |
| 6,142,563 | A * | 11/2000 | Townsend et al. ........ 297/216.1 |
| 6,220,667 | B1 * | 4/2001 | Wagner ...................... 297/391 |
| 6,220,668 | B1 * | 4/2001 | Scheffzuck ................. 297/391 |
| 6,513,871 | B2 * | 2/2003 | Bartels .................... 297/216.12 |
| 7,354,107 | B2 * | 4/2008 | Kohl et al. ................. 297/284.4 |
| 2003/0151279 | A1 * | 8/2003 | Fowler .................... 297/216.12 |
| 2005/0264052 | A1 * | 12/2005 | Dellanno ................. 297/216.12 |

\* cited by examiner

*Primary Examiner* — Milton Nelson, Jr.
(74) *Attorney, Agent, or Firm* — Klauber & Jackson LLC

(57) ABSTRACT

A vehicle seat for use in military vehicles provides increased protection for a helmeted or unhelmeted combatant soldier. The seat includes a seat portion having a layer of high impact energy absorbing material. A back support portion adjoined to the rear of the seat portion extends upwardly for supporting the rearward side of the seated soldier. The back portion has a lower section for supporting the thorax and lower back, and two overlying sections which are positionable for supporting and restraining rearward movement of the helmeted or unhelmeted head and the neck. The overlying sections are moveable toward and away from the soldier and together define a surface and contour which interacts with the seated soldier during rear end impact to maintain the pre-collision shape of the soldier's supported spinal curves, to aid in avoidance of whiplash and similar injuries. Swivelable side portions actuated by sensors flank the sides of the soldier for further protection.

10 Claims, 4 Drawing Sheets

VEHICLE SEAT FOR REDUCING THE RISK OF SPINAL AND HEAD INJURIES OF PERSONNEL IN COMBAT VEHICLES

CROSS REFERENCE TO RELATED APPLICATIONS

The present application is a National Stage Application claiming the priority of co-pending PCT Application No. PCT/US2008/004981 filed Apr. 17, 2008, which in turn claims priority from U.S. Provisional Application Ser. No. 60/925,346, filed Apr. 19, 2007. Applicants claim the benefits of 35 U.S.C. §120 as to the PCT application and priority under 35 U.S.C. §119(e) as to the said Provisional applications, and the entire disclosures of all applications are incorporated herein by reference in their entireties.

RELATED APPLICATION

This application claims priority from U.S. provisional patent application Ser. No. 60/925,346, filed on Apr. 19, 2007.

FIELD OF INVENTION

This invention relates generally to vehicular passenger seats, and more specifically relates to a seating system for use in combat vehicles, which incorporates features for reducing deaths and/or the severity of spinal cord and head injuries suffered by soldiers or other vehicular personnel as a result of enemy attacks and/or from collisions and accidental impact.

BACKGROUND OF INVENTION

Vehicular seats currently used in combat vehicles are unfortunately of such a basic and simplistic design as to lack support systems and blast protection to mitigate the incidence and magnitude of injuries to the soldiers and other personnel that utilize such vehicles in combat zones. Even aside from the obvious dangers imposed on the personnel by attacks on the vehicles, including by enemy use of such weapons as so called "improvised explosive devices" ("IEDs"), combat troops are also exposed to a range of serious injuries during high speed convoy movement of personnel carriers with increased risk of serious spinal injuries and deaths. Frequent convoy deceleration thus results in rear-end collisions; even at slowed speed serious whiplash injury results. High-speed patrols on pot-holed, "wash board" and dirt roads result in repetitive jarring to soldiers resulting over time in spine injuries and brain trauma.

With respect to civilian transportation, increasing efforts have in recent years been made by manufacturers and governmental regulation to prevent or minimize injuries sustained by automobile passengers during accidental collisions. In such regard the present inventor in a series of inventions has disclosed seat constructions which serve to minimize or prevent the whiplash and similar injuries that occur upon rear end impact at a vehicle in which the passenger is riding. These inventions are disclosed in a number of issued patents of the present inventor, including in U.S. Pat. Nos. 5,181,763; 5,290,091; and 5,580,524. The disclosures of the foregoing patents are incorporated herein by reference and constitute important background for the present invention, in that certain of the principles taught therein are synergistically combined in the present invention with further elements to provide a new instrumentality applicable to the vastly more complex and dangerous combat environment to which the invention is applicable.

It may be noted here that certain faulty premises continue to exist regarding rear-end, low-speed collisions. One of these is that whiplash injury is caused by a typical hyperextension movement of the head and neck. In the normal extension movement, the head rotates on the vertebra below C1, C1 rotates over the instantaneous axis of rotation of C2, and then C2 rotates on the C3 instantaneous axis of rotation, and so on until the entire cervical spine completes its full extension motion. In rear-end collisions, this pattern of extension motion does not occur; rather, a completely unnatural motion is observed when high-speed x-ray is used to observe human aberrant spinal kinematic motion. These studies observe axial loading from thoracic spine straightening, causing impaction of the cervical facet plates above and, then, hyperextension of the lower cervical vertebrae rotating and compressing each vertebra from under the vertebra above. This is initiated by the seat back, which is sweeping the lower portion of the neck under the upper portion of the neck. This results in an abnormal double harmonic curve in the cervical spine often referred to as the dreaded "S" curve.

Investigation has contributed to the understanding of injury mechanism by identifying the zygapophyseal joint as the source of pain in 54% of patients with chronic neck pain after whiplash injury. With the zygapophyseal joint identified as the primary injury site, the next development was observation of what happened to these cervical joints during the rear-end impact event on human volunteers. This was accomplished with cineradiography, which showed significant aberration in motion during rear-end impact, resulting in facet plate collision and impingement. Increased shear force and extension motion to the lower cervical vertebra was observed while the upper portion of the cervical spine followed the head into flexion, giving the formation of an "S" curve. The transition area of the S curve was at the level of C4, C5, and C6, the most common injury sites observed in a whiplash victim in post-accident x-ray analysis.

Many variables can influence the forces to the spine that can cause injury: the size of the vehicles, the size of the occupants, and the speeds of the vehicles. Attempting to prevent whiplash injury thus can be a daunting task. However, reducing the global movement of the entire spine and the relative movement of each vertebra appear to be the most practical approach in the prevention of injury to the spine. To accomplish this, all spinal curves should be supported and decelerated at as close to a zero delta velocity as possible. This requires support systems within head-neck restraints and seats that are contoured to the spine to reduce the spinal straightening observed during rear end impact. Additionally, the head-neck restraint and seat back should have complementary dampening characteristics so that simultaneous deceleration of the head, neck, thoracic, and lumbopelvic areas can be achieved.

In my issued U.S. Pat. Nos. 5,181,763 and 5,290,091, apparatus is disclosed for preventing whiplash-related injuries to a passenger in a vehicle. The characteristic shapes of the devices shown therein define a supporting means and contour located behind the cranium and cervical spine of the passenger that interfit with the posterior contour of the passenger's cranium and cervical spine. The supporting means interacts with the passenger during rear end impact to maintain the pre-collision shape of the supported spinal curves, to thereby aid in the avoidance of whiplash and similar injuries. The support contour basically presents a first surface located behind the seated passenger's cranium for contacting the approximate center of mass of the cranium and supporting the approximate central posterior area of the seated passenger's cranium, and a second surface located below the first surface and defining a substantially convex smooth curve, a maximum protrusion point of which in the direction of passenger support projects anteriorly relative to where the first surface contacts the center of mass of the related passenger's cranium, said second surface thereby contacting and supporting the posterior portion of the seated passenger's cervical spine substantially simultaneously with the contact of the seated passenger's cranium with said first surface;

In my further issued U.S. Pat. No. 5,580,124 there is disclosed a vehicle-installed supporting seat for a passenger, which includes a seat back provided with an integral head-neck restraint comprising a cranium support portion and a cervical spine support portion. Each said portion includes a layer of resilient material supported on an underlying inflexible support shell, which together act to effectively define a contour that interfits with the posterior contour of the passenger's cranium and cervical spine. The support shell is rearwardly displaceable upon being subjected to impressed forces generated from the passenger pressing against the restraint as a result of a rear end impact at said vehicle. A controllably deformable energy absorbing crush zone is disposed to the rear of the shell as to be compressed by the rearward displacement of the shell. The interfitting contour and thereby the inflexible shell, upon being displaced by said forces toward the underlying crush zone, retain the shape of the contour, whereby the cervical and cranium support portions act to substantially simultaneously decelerate the cranium and cervical spine of the passenger during a vehicle rear end impact, while the controlled deformation of the crush zone absorbs energy, to prevent whiplash-related injuries to the passenger.

The apparatus of the U.S. Pat. No. 5,580,124 patent preferably further includes a thoracic and lumbar spine support portion which are defined by downward extension of the support shell, resilient material and contour; whereby the thoracic and lumbar spine portion of the passenger are decelerated with the cranium and cervical spine during a rear end impact.

The thoracic section of the human spine is believed to be compressed and flattened during a rear end impact. In addition to being injured, this flattening of the thoracic spine causes axial loading into the cervical spine as the weight of the head and upward pressure of the flattening thoracic spine serve as end point forces to damage the cervical spine. Where present, the thoracic portion of the above seat serves to prevent the flattening of the thoracic spine by having a kyphotic or concave firm contoured shell that takes the shape of the human thoracic spine and maintains this shape during rear end impact. This firm contoured shell precedes the crush zone material which plastically deforms and produces a controlled damping of the forces incurred during a rear end collision.

The lumbar section of the seat will conform to the lumbar spinal curves of the human anatomy. The initial foam that contacts the occupants is combined with the crush zone feature to maximize the energy-absorbing feature of this technology.

It is essential that upon a rear impact at the vehicle, a relatively inflexible surface which approximately conforms to the spine of the seated passenger (herein referred to as the "shaped surface") provides a restraining boundary which maintains the normal curvature of the spine; this despite the fact that the passenger will be subjected to large forces generated by the impact which would otherwise rearwardly accelerate the passenger with respect to the vehicle as a frame of reference.

SUMMARY OF INVENTION

Now in accordance with the present invention, a vehicle seat is provided for use in military vehicles which provides increased protection to a military or other person seated thereon. The invention remedies the three fatal shortcomings of the conventional seats which to present have been used in these vehicles, namely the absence of whiplash protection; the absence of head or neck protection; and the absence of protection from concussive or shrapnel-related injury from roadside IEDs. The invention thus functions to increase protection of fully equipped troops, to thereby significantly reduce deaths and spinal and head injuries.

The vehicle seat of the invention includes a seat portion for supporting the person (typically a soldier or other combatant) when seated thereupon, the seat portion including a layer of high impact energy absorbing material. A back support portion is adjoined to the rear of the seat portion and extends upwardly for supporting the rearward side of the seated person. The back portion has a lower section for contacting and supporting the thorax and lower back of the seated person, and two overlying sections which are positionable to effectively restrain rearward acceleration of the head and neck regions of the seated person imposed by impact. The overlying sections include surfaces facing the seated person which are each independently moveable toward and away from the seated person. Motor means are provided for moving each of the said surfaces of the overlying sections respectively into at least indirect contact with the head and neck regions of the seated person. By "indirect contact" is meant that such contact may be via the helmet 26 which the soldier 28 is seen in FIGS. 2 and 3 to be wearing, or via other protective garb as customarily worn by combat personnel. The sections per se may also be moved as unit structures in the vertical and horizontal directions to achieve the desired contact.

It will be appreciated that protection of a seated combat equipped soldier requires taking into account that the soldier will usually be wearing a combat helmet, the rear surface of which projects beyond the rear of the soldier's helmet-enclosed head. The restraining contour of the present inventor's prior head/neck restraints cannot therefore be used directly. Rather in the present invention the presence of a helmet is accommodated by sensing and contacting the rear of the helmet rather than the head directly with the independently moveable overlying upper of the two sections referred to. The combined contour effectively formed by the upper and lower overlying sections which face the rear of the helmeted soldier will therefore be different than that in my prior inventions since the upper of these sections on being moved into contact with the helmet will be positioned further rearward (than in my prior inventions) to accommodate the projecting helmet. However the consequential effect on the thereby restrained position of the soldier's neck and head will be substantially the same as in my prior inventions and therefore yields the same benefits. Furthermore, because of the independent movement of the two overlying sections, the invention can be effectively used even where the soldier is unhelmeted, or where different helmet designs are used—as is often the case where soldiers coming from different countries are allied combatants.

A sensor at each overlying section is thus connected to sense the proximity of the adjacent helmet or unhelmeted head, and the neck region of the person, and actuate the motor means to move the sections or surfaces facing the seated person into contact with the helmet or unhelmeted head, and the neck region. A pair of upper swivelable side portions flanks the sides of the two overlying portions; and motor means are provided for swiveling each of these upper side portions into at least indirect contact against the sides of the face and the ears of the seated person. A sensor at each of the upper side portions is connected to sense the proximity of the adjacent sides of the face of the seated person and actuate the motor means to move the portions into such contact with the sides of the face. Each upper side portion includes a bulletproof transparent section to avoid blocking the seated person's peripheral vision.

The parts of the two overlying sections which respectively are proximate to and support the helmeted or unhelmeted head, and the neck of the seated person define a supporting means and contour which interacts with the seated person during rear end impact to maintain the pre-collision shape of the supported spinal curves, to aid in the avoidance of whiplash and similar injuries.

The vehicle seat preferably further includes a pair of lower swivelable protective side portions flanking at least portions of the sides of the back support portion. Motor means are employed for swiveling each lower side portion against the sides of the seated person; and a sensor at each lower side portion is connected to sense the proximity of the adjacent sides of the seated person and actuate said motor means to move lower side portions into at least indirect contact with the sides of the person.

The vehicle seat preferably further includes an anti-ballistic shield behind the upper portions. The upper side portions and the lower side portions, as well as the back support portions have inner linings of a high impact energy absorbing material, and outwardly facing coverings of an anti-ballistic material such as Kevlar. The seat portion may also include depressed sacral well for relieving vertical round forces to the seated person's coccyx/sacrum. The entire vehicle seat is mounted to the floor of the vehicle by means enabling the seat to rotate about a vertical axis, which permits the seated person to directly address an attack on the vehicle from the sides or from other directions from the vehicle.

BRIEF DESCRIPTION OF DRAWINGS

The invention is diagrammatically illustrated, by way of example, in the drawings appended hereto, in which.

DESCRIPTION OF PREFERRED EMBODIMENT

Figure 1:
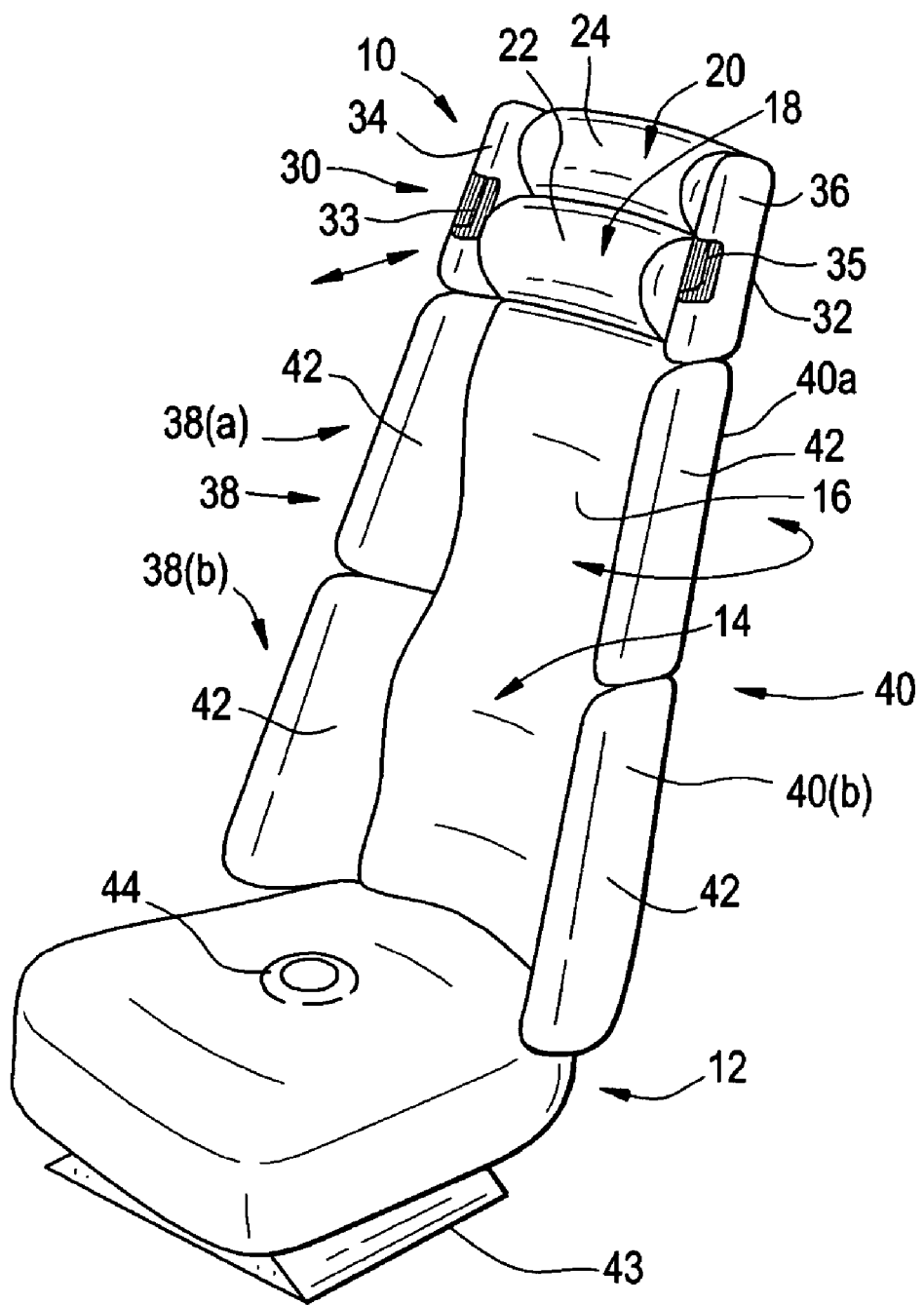
FIG. 1 is a simplified perspective view of a vehicle seat in accordance with the present invention.
Figure 2:
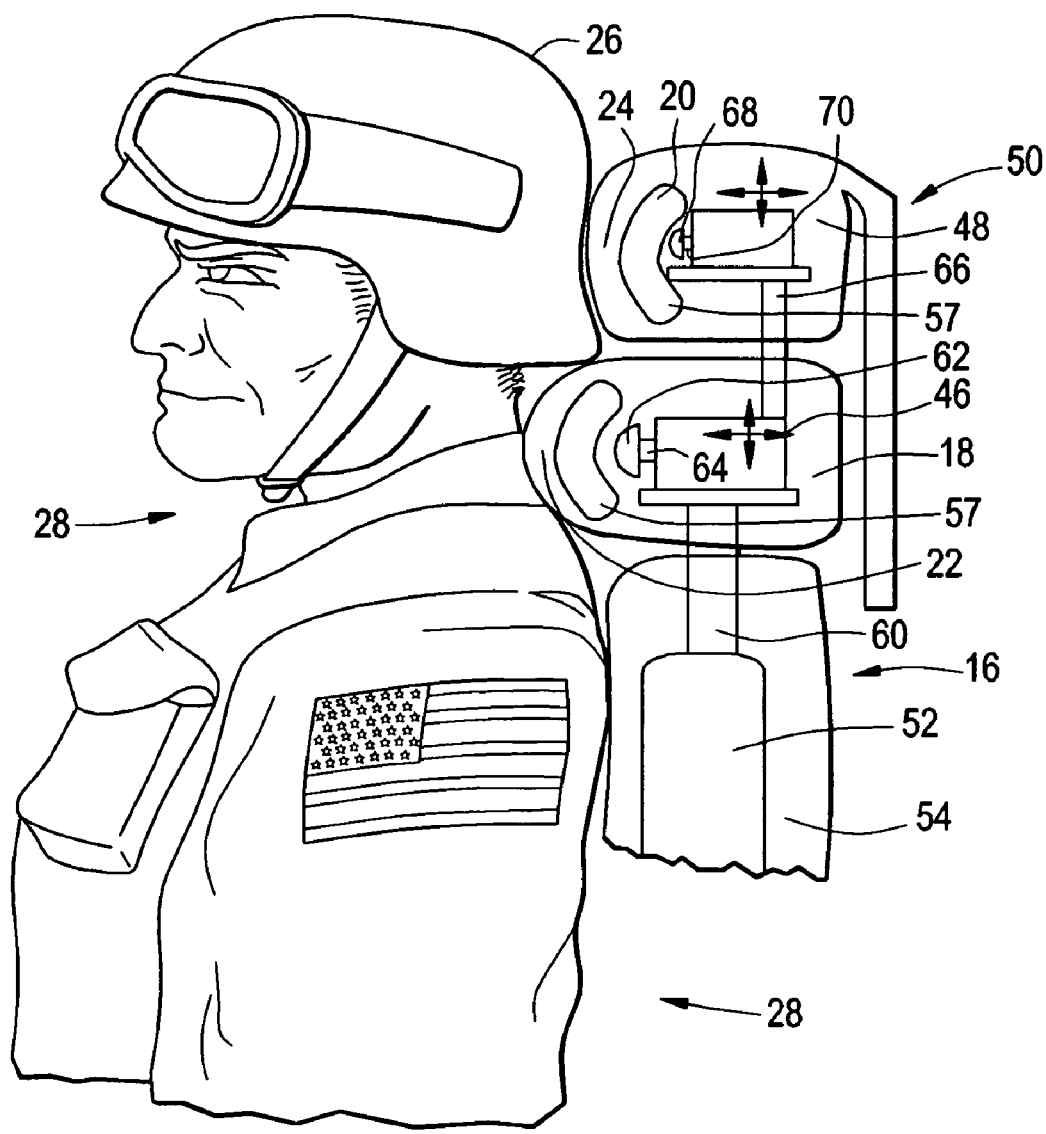
FIG. 2 is a simplified elevational and schematic sectional view showing the upper portions of a combat equipped soldier seated on a vehicle seat as in FIG. 1.
Figure 3:
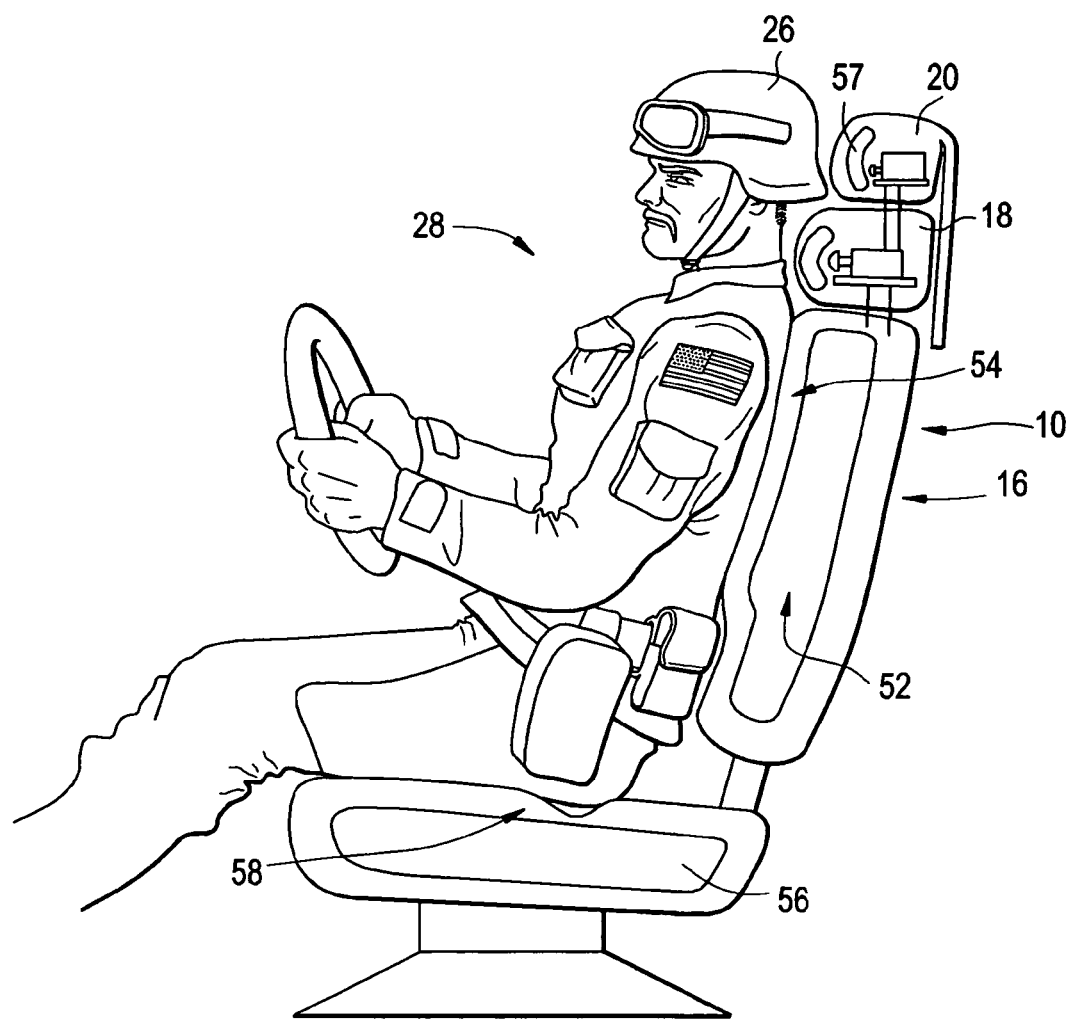
FIG. 3 is a view similar to FIG. 2, but showing additional portions of the seat and of the seated soldier, and also illustrating the initial changes in the position of the soldier on the seat upon a rear end impact at the vehicle.

In FIG. 1 a simplified perspective view is shown of a vehicle seat 10 in accordance with the present invention. Seat 10 includes a seat portion 12 for supporting the person seated thereon, and a back support portion 14 adjoined to the rear of the seat portion and extending upwardly for supporting the rearward side of the seated person. Back portion 14 comprises a lower section 16 for contacting and supporting the thorax and lower back of the seated person, and two overlying sections 18 and 20. The lower of these, section 18, as may be better seen in FIGS. 2 and 3, is positionable proximate to and supporting the neck of the seated person, while section 20 is positionable proximate to and supporting the helmeted head of the seated person. The overlying sections 18 and 20 are each independently moveable vertically and horizontally by means of servomotors, toward and away from the parts of the seated person which they are designed to support. More generally, at least the surfaces of sections 18 and 20 which face and will contact the seated person 28 are displaceable in the vertical and horizontal directions. This can be accomplished by independently so displacing the entire sections 18 and 20 as units. However the entire sections need not move as units toward or away from the operator, so long as the surfaces facing the operator can be so displaced, e.g. by being expanded toward or contracted (due to elasticity) away from the desired contact position. More commonly such surface movement without entire section movement will be applicable to the horizontal surface displacement, i.e. the vertical surface displacement will more readily be accomplished by vertically moving the section bearing the surface as a unit. Sensors 22 and 24 are provided at each upper section which sense the proximity of the adjacent helmet 26 and neck region of the seated person and actuate the motors to move said sections into contact with the helmet and the neck region. As also discussed in the foregoing the contact with the helmet 26 can also be considered as "indirect contact" with the soldier's head.

Lower contact section 18 is supported on a helically threaded member 60 which is anchored in back section 16. Motor 46 when actuated rotates an internally threaded ring which is engaged with member 60 so as to move section 18 upwardly or downwardly. A plunger 62 having a threaded rod 64 is engaged with a second internally threaded rotatable ring which by its rotation acts to advance or retract the core 57 so as to effect contact with the vehicle operator's neck. It will be apparent that the entire section 18 need not move as a unit toward or away from the operator, so long as the surface facing the operator can expand or contract with the horizontal displacement of core 57. In direct analogy, upper contact section 20 is supported on a helically threaded member 66 and motor 48 when actuated rotates an internally threaded ring which is engaged with member 66 so as to move section 20 upwardly or downwardly or move the surface facing the operator toward or away from contact with the operator. A plunger 68 having a threaded rod 70 is engaged with a second internally threaded rotatable ring which acts to advance or retract the core 57 so as to effect contact of section 20 with the vehicle operator's head or helmet.

Vehicle seat 10 is further provided with a pair of upper swivelable side portions 30 and 32, which flank the sides of the two overlying portions 18 and 20. Servomotors are disposed for swiveling each side portion into at least indirect contact against the sides of the face and ears of the seated person. A sensor 34,36 at each said side portion 30,32 is connected to sense the proximity of the adjacent sides of the face of the seated person and actuate the motors to move the portions 30,32 into at least indirect contact with the sides of the face. In order to assure that the seated person has fully adequate peripheral vision, transparent bulletproof shields 33, 35, are inserted at the side portions 30 and 32.

The vehicle seat 10 is further provided with a pair of protective lower swivelable side portions 38 and 40, which flank at least portions of the sides of back support 16. As seen in the Figure these side portions can actually each consist of two sub-portions as at 38(*a*) and 38(*b*) and at 40(*a*) and 40(*b*). This enable greater flexibility in adjusting the side portions to accommodate differing body types and differing weights etc. Servomotors swivel each lower side portion 39, 40, or 38(*a*) and 38(*b*) and 40(*a*) and 40(*b*) against the sides of said seated person; and sensors 42 at each lower side portion or sub-portion are connected to sense the proximity of the adjacent sides of the seated person and actuate the motors to move the lower side portions or sub-portions into at least indirect contact with the sides of the person.

Figure 4:
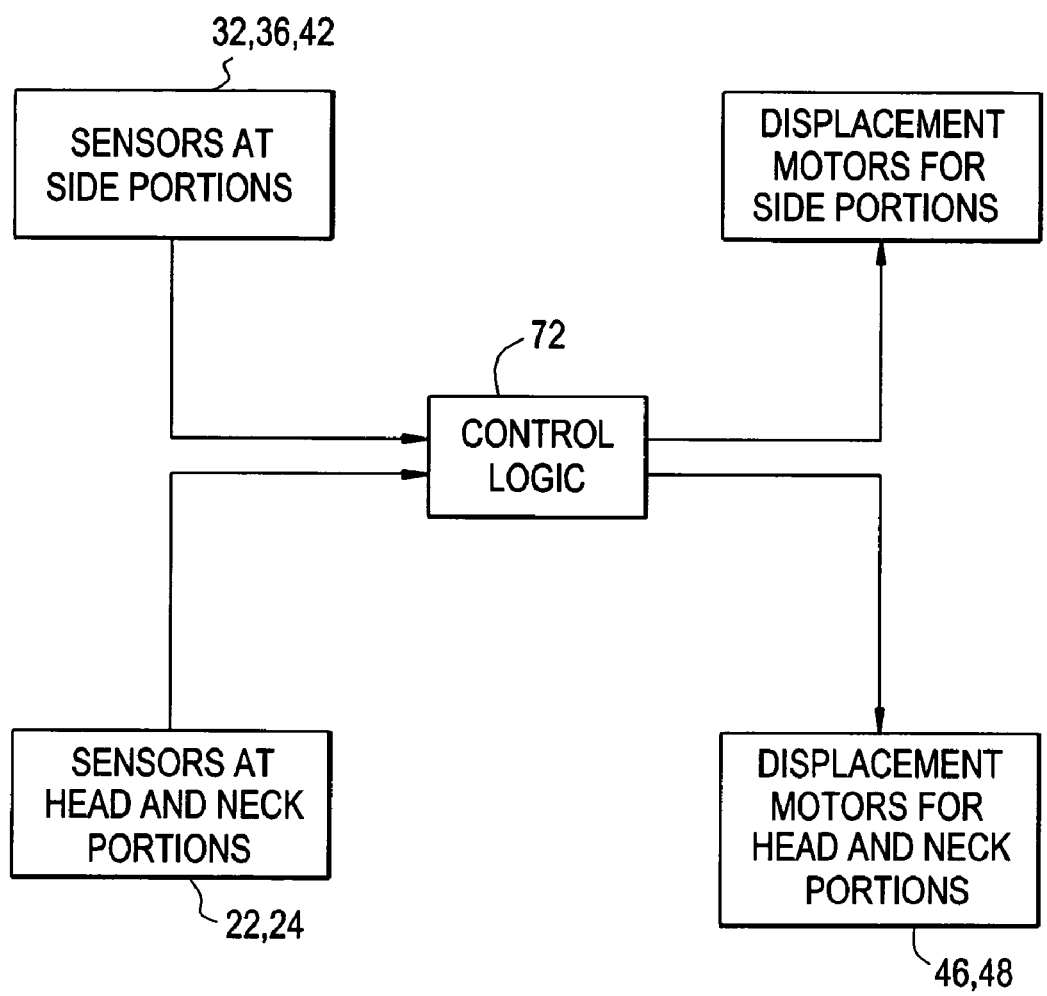
FIG. 4 is a simplified schematic block diagram showing the control elements involved in operation of the present invention.

Actuation and control of the motors 46 and 48 is illustrated in FIG. 4. The proximity sensors 22 and 24 provide input signals to control logic 72 which provides actuation signals to the motors 46 and 48 in accordance with the detected position of the operator 28, to advance the sections vertically and horizontally to effect the desired contacts with the operator or to move the surface facing the operator toward or away from contact with the operator. FIG. 4 also illustrates the analogous control of the upper and lower swivelable side portions 30, 32, 38(*a*) and 38(*b*) and 40(*a*) and 40(*b*). In these instances sensors 34, 36, and 42 provide the signal inputs to control logic 72, which in turn actuates and controls the servo motors which effect movement of these side portions toward and away from the seated vehicle operator.

Each of the upper and the lower swivelable side portions, as well as the seat portion 12, have inner linings of a high impact energy absorbing material. This material is preferably a semi-solid plastic-like substance such as the shear-thickening viscoelastic polymer available as the Zoombang products of Impact Innovative Products of Irwin, Pa. These materials can also be formulated to have anti-ballistic properties. These panels serve to protect the seated person from lateral and vertical impact forces caused by IEDs and concussions. The outwardly facing surfaces of the side portions are provided with anti-ballistic coverings such as products of this type commercially available from Tactronics Inc. of Westhampton, N.Y.

The seat portion 12 also includes a depressed sacral well 44 for relieving vertical round forces to the seated person's coccyx/sacrum The entire said vehicle seat 10 is mounted to the floor of the vehicle by a base 43 upon which it is swivelable, enabling the seat to rotate about a vertical axis. This enables the seated person to directly address an attack on the vehicle from the sides or from other directions from the vehicle.

FIGS. 2 and 3 show additional details of seat 10 and the manner in which its structure interacts and protects the representative soldier 28 who is shown seated thereon. One such additional detail is the provision of an anti-ballistic skirt or shield 50 which extends downwardly from the top of upper section 20 to cover the backs of both sections 18 and 20 as well as extending somewhat further. The anti-ballistic material can comprise the aforementioned or other material known in the art to be useful for protective or armoring purposes. It will be noted in FIG. 2 that sections 18 and 20, as already mentioned, are each capable of vertical (up and down) movement and of horizontal movement (toward and away from soldier 28) via servomotors 46 and 48. The sensors 22 and 24 act to sense the position of the soldier's helmeted head and neck and actuate the motors accordingly.

In FIG. 2 it can be assumed that a rear impact has occurred causing the soldier 28 to move rearward against the back of the seat. Here it will be seen that the forward projecting surfaces of the sections 18 and 20 are such as in combination to define a supporting means and a contour located behind the seated soldier 28 that interacts with the soldier during rear end impact to maintain the pre-collision shape of the supported spinal curves, to thereby aid in the avoidance of whiplash and similar injuries.

FIG. 3 shows yet additional aspects of the present invention. This view is further noteworthy in illustrating what occurs during the very early phase of a rear-end impact at the vehicle. At such point the head of soldier 28 has not quite been accelerated fully to the rear. Rather it is the lower back portion 16, which first is required to absorb the forces of the rearward accelerating body of soldier 28. This however it readily does, including by virtue of the high impact energy absorbing material 52 (the nature of which has been discussed in the foregoing) constituting an inner core of the seat back portion 16. This is aided by an outer energy absorbing foam-covering 54. Rear impact forces are also further reduced by a further high impact energy absorbing core 56 and an outer energy absorbing foam 58 which are present at seat portion 12. The overlying sections 18 and 20 are provided with a corresponding high impact energy absorbing core 57. The net effect of the entire arrangement is to essentially decelerate the head, neck and thorax together, which prevents the neck straightening and S-curve shape that causes the injury during whiplash.

While the present invention has been set forth in terms of specific embodiments thereof, it will be appreciated that in view of the present disclosure, numerous variations upon the invention are now enabled to those skilled in the art, which variations yet reside within the present teachings. Thus while the invention has been particularly described in connection with its use to protect combat and military personnel, it will be evident that the invention has applicability as well to other vehicular operators and passengers, where indeed the reduced forces occurring e.g. in simple collisions are less than in combat situations, so that the likelihood of injuries in these situations is reduced even more than where the invention is employed in combat environments. Accordingly the invention is to be broadly construed, and limited only by the scope and spirit of the disclosure and of the claims now appended hereto.

The invention claimed is:

1. A vehicle seat for use in military vehicles for providing increased protection to a helmeted or unhelmeted military or military support person seated thereon, comprising:
  (a) a seat portion for supporting said person when seated thereupon, said seat portion including a layer of high input energy absorbing material;
  (b) a back support portion adjoined to the rear of said seat portion and extending upwardly for supporting the rearward side of the seated person;
  (c) said back support portion comprising a lower section for contacting and supporting the thorax and lower back of said person, and upper and lower overlying sections for being respectively positionable for restraining the helmeted or unhelmeted head and the neck region of said person from rearward acceleration imposed by impact at the vehicle;
  (d) said overlying sections each having a surface for contacting said seated person which is independently moveable toward and away from said seated person;
  (e) first motor means for moving the upper and the lower of said overlying sections into the positions for respectively restraining rearward acceleration of the helmeted or unhelmeted head and of the neck region of the seated person;
  (f) a sensor at each said overlying section connected to respectively sense the proximity of the adjacent helmeted or unhelmeted head and of the neck region of said person and actuate said first motor means to move said overlying sections into said positions for said restraining of rearward acceleration of the helmeted or unhelmeted head and of the neck regions of the seated person;
  (g) a pair of upper swivelable side portions flanking the sides of said two overlying sections;
  (h) second motor means for swiveling each said upper swivelable side portion into at least indirect contact against the sides of the face and the ears of said seated person; and (i) a sensor at each said upper swivelable side portion connected to sense the proximity of the said sides of the face of said seated person and actuate said second motor means to move said upper swivelable side portions into said at least indirect contact with said sides of the face.

2. A vehicle seat in accordance with claim 1, wherein said sensor upon sensing the helmet of a seated helmeted person, activates said first motor means to move the said surface of said upper section to contact said helmet.

3. A vehicle seat in accordance with claim 2, wherein the said surfaces of said two overlying sections which contact the helmeted head and neck region of said person define a supporting means and contour which interacts with the seated person during rear end impact for restraining the head and neck region of said person from rearward acceleration to maintain the shape of the person's supported spinal curves, to thereby aid in avoidance of whiplash and similar injuries.

4. A vehicle seat in accordance with claim 2, wherein said layer of high impact energy absorbing material comprises a semi-solid shear-thickening viscoelastic polymer.

5. A vehicle seat in accordance with claim 2, including a pair of protective lower swivelable side portions flanking at least portions of the sides of said back support portion; said second motor means further being adapted for swiveling each said lower swivilable side portion against the sides of said seated person; and a sensor at each said lower swivilable side portion connected to sense the sides of said seated person and actuate said second motor means to move said lower swivilable side portions into at least indirect contact with the said sides of said person.

6. A vehicle seat in accordance with claim 5, wherein each said upper swivilable side portion includes a bullet proof transparent section to avoid blocking the seated person's peripheral vision.

7. A vehicle seat in accordance with claim 6, wherein said seat portion includes a depressed sacra well for relieving vertical round forces to the seated persons coccyx/sacrum.

8. A vehicle seat in accordance with claim 6, wherein said upper swivilable side portions and said lower swivilable side portions have inner linings of high impact energy absorbing material, and outwardly facing coverings of an anti-ballistic material.

9. A vehicle seat in accordance with claim 5 further including an anti-ballistic shield behind said overlying sections.

10. A vehicle seat in accordance with claim 9, including base means for mounting the entire said vehicle seat to the floor of a said vehicle with which it is used which enable the seat to rotate about a vertical axis, whereby to permit the seated person to directly address an attack on the vehicle from the sides or from other directions from the vehicle.

* * * * *